United States Patent [19]

Ambrose et al.

[11] Patent Number: 4,749,743

[45] Date of Patent: Jun. 7, 1988

[54] EPOXY-FUNCTIONAL POLYURETHANES AND HIGH SOLIDS THERMOSETTING COATING COMPOSITIONS THEREOF

[75] Inventors: Ronald R. Ambrose, Allison Park; Samuel Porter, Jr., Natrona Heights, both of Pa.

[73] Assignee: PPG Industries, Inc., Pittsburgh, Pa.

[21] Appl. No.: 915,364

[22] Filed: Oct. 6, 1986

[51] Int. Cl.$^4$ .............................................. C08G 18/30
[52] U.S. Cl. .................................. 525/123; 525/127; 525/176; 525/185; 525/327.3; 528/28; 528/45; 528/65; 528/66; 528/73; 528/99; 528/113; 528/119

[58] Field of Search ............... 525/123, 127, 176, 185, 525/327.3; 528/28, 45, 65, 66, 73, 99, 113, 119

[56] References Cited

U.S. PATENT DOCUMENTS

| | | | |
|---|---|---|---|
| 3,424,719 | 1/1969 | Masters | 528/73 |
| 3,505,284 | 4/1970 | Dalhuisen | 528/73 |
| 3,984,376 | 10/1976 | Yokono et al. | 528/73 |

Primary Examiner—Maurice J. Welsh
Attorney, Agent, or Firm—Godfried R. Akorli

[57] ABSTRACT

Disclosed herein is a low molecular weight epoxy-functional polyurethane and high solids thermosetting coating compositions prepared therewith.

10 Claims, No Drawings

EPOXY-FUNCTIONAL POLYURETHANES AND HIGH SOLIDS THERMOSETTING COATING COMPOSITIONS THEREOF

BACKGROUND OF THE INVENTION

1. Field of the Invention

The present invention relates to thermosetting coating compositions and methods of making and using the same. More specifically, the present invention relates to epoxy-functional polyurethane resins which are useful in making coatings which can be hard and/or flexible and have a remarkable appearance.

2. Brief Description of the Prior Art

Recent advances in coating technology have provided coatings which are suitable for use over various substrates which are difficult to coat. Coatings of excellent appearance, a high order of durability and having the ability to withstand severe environmental conditions have been obtained. Among the more advanced coatings are those employed on vehicles, such as automobiles, where good appearance must be maintained over long periods despite exposure to weather and various forms of attack during use.

For some time now elastomeric material which are rubbery, and resilient materials have been used for areas which are subject to mechanical shock such as automobile bumpers and moldings, exposed corners and surfaces of industrial machines, kickplates and other areas of doors and entrances, and the like. The use of such elastomeric materials aids in providing protection against permanent structural damage, but in order to attain the desired appearance a decorative and protective coating must be applied to the surface. Conventional coatings, including those employed on rubber and similar extensible objects must have the required combination of properties. These necessary properties include: Extensibility—This property is necessary in order that the advantages of the resilient substrate can be utilized without destruction of the integrity of the surface of the coating. Tensile Strength—A high degree of tensile strength is also necessary in order to avoid rupture of the film during use. Film Stability—Certain coatings which are extensible and which have a relatively high tensile strength lose these properties upon aging and particularly if the coating is exposed to sunlight, weathering, etc. Impact resistance—The coating should have adequate impact resistance at various temperatures as encountered in extreme weather variations. Adhesion—The coating should have satisfactory adhesion to the various substrates with which it is to be employed including extensible materials such as foams, rubber and the like, and metals such as mild steel. In addition the coatings should have satisfactory intercoat adhesion with succeeding coats or with various primers which can be employed. Chemical and Humidity Resistance—This includes properties such as saponification resistance upon exposure to acids and alkalis, resistance to various solvents and resistance to atmosphere of high humidity and heat.

Still other properties which are important for commercial applicability include hardness and mar resistance which make the coating particularly suitable for hard metallic substrates. Ideally, if a coating has the hardness suitable for metal substrates and is at the same time flexible, one can use the same coating for metallic and elastomeric substrates. Such a coating is described as a universal coating.

Yet other properties which are important for commercial applicability include sprayability at high solids and low volatile organic content.

It is especially difficult to obtain the above properties in combination since, in most instance, the obtention of one or several of the properties desired requires the use of materials and formulations which under ordinary circumstances tend to make the other desired properties less satisfactory. The present invention provides coating compositions that can have desirable combinations of properties disclosed herein.

SUMMARY OF THE INVENTION

In accordance with the foregoing, the present invention encompasses a low molecular weight epoxy-functional polyurethane resin comprising:

(a) an isocyanate, and (b) a hydroxyl-functional polyepoxide having 2 or more epoxy group per molecule.

The invention further encompasses high solids thermosetting coating compositions comprising the above epoxy-functional polyurethane and a curing agent selected from the group consisting of a polyacid, an anhydride, a polyamine and mixture thereof. The coating compositions of this invention are characterized by high sprayability, acceptable sag control, low volatile organic content, a remarkable appearance, hardness, flexibility and other desirable film properties. Hence, the coatings can be used as elastomeric or universal coatings.

By the term "elastomeric coating" is meant that the coating is flexible and hard enough to be useful particularly as a topcoat on elastomeric substrates. By the term "universal coating" is meant that the coating is conjointly flexible and relatively harder than that which is required for elastomeric substrates, thus, making said coating useful particularly as a topcoat on elastomeric and (hard) metallic substrates.

In this text, the terms molecular weight, thermosetting, solids content, sprayability, volatile organic content (VOC), flexibility, hardness and appearance are defined as follows. The term "molecular weight" refers to a number average molecular weight as determined by gel permeation chromatography using a (polystyrene or glycol) standard. Therefore, it is not the actual molecular weight which is measured but a number average molecular weight which is relative to the (glycol or polystyrene) standard.

In this context, by the term "thermosetting" is meant that the coating composition, upon heating, changes irreversibly from a fusible and soluble material into one which is infusible and insoluble through the formation of covalently crosslinked thermally stable network.

The solids content of a composition is determined by ASTM D-2369 testing modified as follows: 0.3 grams of the composition is mixed with 5 milliliters of 1:1 mixture of acetone and tetrahydrofuran and heated typically at 110° C. for 1 hour in a forced draft oven. The composition is then cooled in a desiccator, reweighed and the nonvolatile content calculated. The percentage by weight of the composition remaining is the solids content.

The term "sprayability" means the maximum concentration of solids at which the coating composition can form a uniformly deposited coating, under normal spraying conditions of, say, temperature, pressure, and spray equipment design such as entails the use of an air suction gun operating at 60 psi with a No. 30 air cap. This maximum concentration is solvent dependent and usually occurs in a viscosity range of 20 to 80 and preferably at about 22 to 24 seconds with a No. 4 Ford cup at room temperature after thinning with a solvent such as a mixture of methyl amyl ketone and ethoxyethyl acetate or the like. Above this maximum concentration, appearance as manifested by leveling and solvent popping becomes unacceptable.

The VOC is defined as the weight per volume of any compound of carbon which evaporates from a paint or related coating material under the specific conditions for the determination of the non-volatile content of that material. Thus, the water content of the material undergoing analysis must be determined. To obtain the VOC of a sample, the non-volatile content, water content and the density of the material are determined. The VOC number is calculated by correcting the total organic volatile content for the water content and dividing by the volume of the paint corrected for the water content. The determination of the VOC is by ASTM D-3960 testing which entails heating the paint or related coating material at 110° C. for 1 hour.

The flexibility property of the coating can be determined by spray coating an elastomeric substrate and curing the coating at optimum conditions to give a dry film thickness of 1.5 to 2 mils. The elastomeric substrate is 1/16 to 3/16, typically ⅛-inch thick, thermoplastic polyurethane, such as commercially available from Mobay Company as TEXIN 355D. The coated substrate is bent around a ½-inch diameter mandrel with the coating side facing outward. After bending, the coating is examined for breaks and cracks. Testing can be conducted at standard temperatures such as room temperature, that is, 72°-77° F., or at lower temperatures. The lower temperatures can be obtained by cooling the substrate to standard temperatures of 45° F., 35° F., or 0° F. before bending. The lower the temperature, the more stringent the test. Preferably, the coating can withstand bending at 20° F., more preferably 0° F. The flexibility property of the coating is considered as good when there is no break in the coating or substantially no break, i.e., when the occurring break is not completely across the width of the substrate which is about 1 to 3 inches, at the measured temperature. Usually for elastomeric coatings, flexibility at 0° F. or lower is desirable.

The hardness property of the coating composition can be determined by the Sward method using a Sward Rocker as described in ORGANIC COATING TECHNOLOGY, Payne, Vol. 1, 1965, pages 642-643. Testing is done on an optimally cured coating having a dry film thickness of 1¼ to 2 mils over 20 gauge steel panels. Usually for elastomeric coatings, Sward hardness of about 10 or greater is desirable. For universal coatings, Sward hardness of about 14 or greater, and typically about 20 or greater and preferably about 30 or greater is desirable. Usually for universal coatings, flexibility at standard or lower temperatures as described hereinabove is desirable.

Appearance is measured in terms of distinctness of image (DOI) which is measured by on Dori-Gon Meter D47-6 manufactured by Hunter Laboratories. Additionally, the coatings of this invention given an impression of having a "wet-look" of a freshly applied and unbaked coating.

DETAILED DESCRIPTION OF THE INVENTION

The coating compositions of this invention are of high solids. Sprayability of these coating compositions can be about 40 percent or higher and typically about 40 to 65 percent solids. To obtain the resins and coating compositions of this invention, the starting materials are selected on the basis described more fully hereinbelow.

The starting hydroxy-functional polyepoxides useful herein are low molecular weight polyepoxides which can have 2 or more epoxy groups per molecule, and typically have more than 2 epoxy groups per molecule and preferably 3 or more epoxy groups per molecule. The polyepoxides useful here can have epoxide equivalent weights of 50 to 1000 and preferably 100 to 500, and hydroxy equivalent weights of 100 to 2000 and preferably 300 to 600. Typical examples, thereof, include hydroxy-functional epoxy ethers and esters which are preferred herein and others such as epoxy group containing acrylic polymers which also contain a hydroxyl group; or a mixture thereof.

Illustrative examples of the epoxy ethers can be glycidyl ethers such as glycerol polyglycidyl ether (having about 3 epoxy groups); trimethylolpropane polyglycidyl either (having about 3 epoxy groups); diglycerol polyglycidyl ether (having about 3 epoxy groups); sorbitol polyglycidyl ether (having about 4 epoxy groups); such as is available from Nagase America Corporation under the Tradename "DENACOL".

Yet other hydroxy-functional epoxy resins can be prepared by modifying an epoxy-containing material to produce a polyepoxide containing a hydroxy group and residual epoxy groups. For example, one or more epoxy groups of a polyepoxide can be reacted with organic acid or the like to generate hydroxyl groups while retaining residual epoxy groups. As yet another example, the hydroxyfunctional polyepoxides can be prepared by reacting one or more epoxy groups of a polyepoxide with, say, organic acid to generate hydroxyl groups, said hydroxyl groups may be reacted with, say anhydrides to generate acid groups which may in turn further react with epoxy groups of a polyepoxide. This process can yield molecules with high epoxy functionality, which molecules also contain hydroxyl groups. Illustrative examples of polyepoxides which may be modified include the triglycidyl isocyanate available from Ciba Giegy as ARALDITE PT 810, butanediol diglycidyl ether, and 3,4-epoxycylohexylmethyl-3,4-epoxycyclohexyl carboxylate.

Illustrative examples of the epoxy-functional acrylic polymers which also contain a hydroxyl group are copolymers of an ethylenically unsaturated monomer containing an epoxy group and an ethylenically unsaturated monomer containing a hydroxyl group. The copolymers are prepared by free radical polymerization of the ethylenically unsaturated monomers. Examples of the ethylenically unsaturated monomers containing an epoxy group can be a glycidyl acrylate, a glycidyl methacrylate, and an allyl glycidyl ether. Examples of ethylenically unsaturated monomers containing a hydroxyl group can be hydroxyethyl acrylate, hydroxypropyl acrylate and the like. Other copolymerizable monomers different from the above can be alkyl esters of acrylic or methacrylic acid, e.g., ethyl acrylate, butyl acrylate or 2-ethylhexyl acrylate, ethyl methacrylate, butyl methacrylate and the like; vinyl monomers such as styrene, vinyl toluene and the like.

In preparing the epoxy-functional polyurethanes, isocyanates are reacted with the hydroxyl groups of the aforedescribed polyepoxides. The isocyanates including isocyanate prepolymers useful herein are of low molecular weight and have an isocyanate equivalent weight of 87 to 2000 and preferably 87 to 1500. Examples of the useful isocyanates can be aliphatic or aromatic isocyanates. Illustrative examples of the useful isocyanates can be simple isocyanates such as, isophorone diisocyanate, trimethylhexamethylene diisocyanate, dicyclohexylmethane diisocyanate, toluene diisocyanate; isocyanurates such as the isocyanurate available from Mobay Chemical as "Des N-3390"; isocyanurate derived from isophorone diisocyanate, commercially available from VEBA Company as T1890; biurets such as the biuret from 1,6-hexamethylene diisocyanate, commercially available from Mobay Chemical as DESMODUR N. The isocyanate prepolymers can be prepared by, say, reacting a polyisocyanate, in excess, with an active hydrogen-containing material such as a polyol.

In preparing the epoxy-functional polyurethane, the isocyanate and the hydroxy-functional polyepoxide can be reacted in an equivalent ratio of one isocyanate group to one or more hydroxyl group(s). The temperature of the reaction can be from about 70° C. to 110° C. Catalysts such as dibutyltin dilaurate can be employed. Also, inert solvents can be employed. The resultant product comprising the epoxy-functional polyurethane can have an epoxy equivalent weight of 200 to 1000 and preferably 200 to 800.

Curing agents that are useful herein are of low molecular weight. The curing agents can be selected from the group consisting of polyacids, anhydrides, polyamines and a mixture thereof. Other curing agents such as aminoplasts, isocyanates, blocked isocyanates, alkoxysilanes or the like can be used, in complimentary amounts.

The polyacids typically have molecular weight from about 90 to 2000 and preferably from about 300 to 1000. The polyacids can be simple polyacids or their adducts. Usually, liquid polyacids are employed. Non-limiting examples of these acids are succinic acid, glutaric acid, adipic acid, azelaic acid, oxalic acid, phthalic acid, isophthalic acid, hexahydrophthalic acid, methylhexahydrophthalic acid, maleic acid, chlorendic acid and the like. Also there can be employed polyacids of higher acid functionality, e.g., trimellitic acid, tricarballylic acid, aconitic acid and the like.

Non-limiting examples of the polyacid adducts can be acid-functional polyesters, acid-functional polyurethanes and the like. An example of the acid functional polyesters can be prepared by reacting excess of a simple polyacid as described above with a polyol. Alternately a polyacid anhydride such as described below can be reacted with the polyol, such as 1,6-hexanediol, trimethylol propane and polycaprolactone triol or a mixture thereof.

The anhydrides useful herein as curing agents comprise monoanhydrides of low molecular weight. Examples of the monoanhydrides are alkyl hexahydrophthalic anhydride wherein the alkyl group has up to 7 carbon atoms, e.g., methylhexahydropathalic anhydride. Other anhydrides that can be used herein include aliphatic, including cycloaliphatic, olefinic and cycloolefinic anhydrides and aromatic anhydrides. Substituted aliphatic and aromatic anhydrides are also included within the definition of aliphatic and aromatic provided the substituents do not adversely affect the reactivity of the anhydride or the properties of the resultant product. Examples of substituents would be chloro, alkyl and alkoxy. Examples of anhydrides include succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, hexahydrophthalic anhydride, alkylhexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride and maleic anhydride.

In the practice of this invention as a coating composition, the epoxy-functional polyurethane and the curing agent can be employed in an amount sufficient to provide an effective cure wherein the cured coating is hard and solvent-resistant. For example, the epoxy-functional polyurethane and a polyacid curing agent can be employed in an amount of about 0.8:1 to 1.2:1 based on the acid group to the epoxy group.

The particular epoxy-functional polyurethane and curing agent that are employed will depend on the nature thereof and the desired properties of the resultant coating. In essence, the epoxy-functional polyurethane and the curing agent, are selected on basis that will ensure the desired hardness and/or flexibility of the cured coating. Generally put, for elastomeric coating, soft block epoxy-functional polyurethanes and curing agents can be employed. For universal coatings, relatively harder block ingredients can be employed. Also, combinations of hard block and soft block epoxy-functional polyurethanes and the curing agents can be employed in order to obtain the required hardness and/or flexibility.

Illustratively, for an elastomeric coating, an epoxy-functional polyurethane can be prepared by reacting a hydroxy functional polyepoxide available from Nagase America Corporation as DENACOL 421 with an isocyanurate T 1890 commercially available from VEBA Company. The curing agent can be a polyacid adduct which is prepared by reacting methyl hexahydrophthalic anhydride, with the trifunctional polycaprolactone polyol PCP 0305 available from Union Carbide Corporation. For a universal coating, the epoxy-functional polyurethane can be prepared by reacting DENACOL 421 with an isocyanate prepolymer which is prepared by reacting excess isophorone diisocyanate, with a polyester polyol derived from hexahydropthalic anhydride, adipic acid and neopentyl glycol. The curing agent can be a polyacid derived from trimethylol propane and methyl hexahydropthalic anhydride.

It is envisaged that the coating compositions of this invention would be practiced as multi pack, e.g., two-pack coating compositions. For example, the epoxy-functional polyurethane can be contained in one pack and the curing agent and cure catalyst in another.

Typically, coating additives, such as ultraviolet light absorbers and/or stabilizers, flow control agents, antioxidants, plasticizers, and the like can be added to the coating composition. These additives can be used in amounts up to about 25 percent by weight based on the total resin weight.

The coating composition can be applied to the substrate by any of the conventional coating techniques such as brushing, spraying, dipping or flowing, but it is preferred that spray such as compressed air spraying, electrostatic spraying and either manual or automatic methods which are preferred.

It is a distinct feature of the invention that the high solids thermosetting coating compositions of this invention display an acceptably good sag control at a film thickness of up to about 2 mils. Considering that coating compositions comprising low molecular weight components generally have sag control problems, it is indeed surprising that the instant coatings having low molecular weight components have the acceptable sag control. Thus, relatively lower amounts, if any at all, of sag control agents need to be added to the coating composition. Therefore, these coating compositions do not suffer a reduced solids content and poorer appearance, as is otherwise the case with art-related high solids compositions wherein sag control agents are added.

After application of the coating composition to the substrate, the coated substrate is heated to cure the coating. In the curing operation, solvents are driven off and the film-forming material is crosslinked. The heating or curing operation is usually carried out at a temperature in the range of from 160°-350° F. (71°-177° C.) but if needed lower or higher temperatures may be used depending upon whether it is sufficient to activate any necessary crosslinking mechanisms. The thickness of the coating is usually from about 1 to 5, preferably 1.2 to 3 mils.

Preferably, the compositions of the present invention, particularly those prepared with the aliphatic and cycloaliphatic polyepoxides are used to formulate clear coats for use in a color-plus-clear application. In a color-plus-clear application, a composite coating is applied to a substrate. The process comprises applying to the substrate a pigmented or colored film-forming composition to form a base coat and applying to the base coat a second non-pigmented film-forming composition to form a transparent top coat over the base coat.

The film-forming composition of the base coat can be any of the compositions useful in coating applications, particularly automotive applications in which the color-plus-clear coating applications are finding frequent use. A film-forming composition conventionally comprises a resinous binder and a pigment to act as a colorant. Particularly useful resinous binders are acrylic polymers, polyesters including alkyds and polyurethanes. The resinous binder for the base coat can be an organic solvent-based material such as those described in U.S. Pat. No. 4,220,679, note column 2, line 24, continuing through column 4, line 40. Also, water-based coating compositions such as those described in U.S. Pat. No. 4,403,003 and U.S. Pat. No. 4,147,679 can also be used as the binder in the base coat composition. The film forming composition for the base coat can also be the epoxy-functional polyurethane and the curing agent of the present invention.

The base coat composition also contains pigments to give it color. Examples of suitable pigments for the base coat are described in the aforementioned U.S. Pat. Nos. 4,220,679, 4,403,003 and 4,147,679.

Optional ingredients in the base coat composition are those which are well known in the art of formulating surface coatings and include surfactants, flow control agents, thixotropic agents, fillers, anti-gassing agents, organic co-solvents, catalysts and other customary auxiliaries. Examples of these materials and suitable amounts are described in the aforementioned U.S. Pat. Nos. 4,220,679, 4,403,003 and 4,147,679. The usual spray techniques and equipment for air spraying and electrostatic spraying in either manual or automatic methods can be used.

During application of the base coat to the substrate, a film of the base coat is formed on the substrate typically in a thickness of about 0.1 to 5 and preferably about 0.1 to 2 mils. After forming a film of the base coat on the substrate, solvent, that is, organic solvent and/or water, is driven out of the base coat film by heating or simply air drying for a period of time before application of the clear coat. Preferably, the heating step will only be that sufficient and for a short period of time to insure that the clear top coat composition can be applied to the base coat without the former dissolving the base coat composition, that is, "striking in". Suitable drying conditions will depend on the particular base coat composition, on the ambient humidity with certain water-based compositions, but in general a drying time of from about 1 to 5 minutes at a temperature of about 68°-175° F. (20°-79° C.) will be adequate to insure that mixing of the two coats is minimized. At the same time, the base coat film is adequately wetted by the clear top coat composition so that satisfactory intercoat adhesion can be obtained. Also, more than one base coat and more than one top coat may be applied to develop optimum appearance. Usually between coats, the previously applied base coat or top coat is flashed, that is, exposed to ambient conditions for about 1 to 20 minutes.

The clear top coat composition is applied to the base coat by any of the conventional coating techniques mentioned above, although spray applications are preferred. As mentioned above, the clear top coat is applied to the base coat via a wet-on-wet technique before the base coat has been cured. The two coatings are then heated to conjointly harden both coating layers. Curing conditions such as described above can be used.

The invention will be further defined by reference to the following examples. Unless otherwise indicated, all parts are by weight.

EXAMPLE 1

This example illustrates the epoxy-functional polyurethanes of this invention and methods of preparing the same. This entails first preparing a polyester polyol, followed by preparing an isocyanate prepolymer therewith, and reacting the prepolymer with a hydroxy-functional epoxy.

The polyester polyol was prepared as follows:

| Ingredients | Parts by Weight (grams) | |
|---|---|---|
| Hexahydrophthalic anhydride | 1488.9 | ⎫ |
| Triphenylphosphite | 1.75 | ⎬ Charge A |
| Butylsulfonic acid | 1.75 | ⎭ |
| Neopentyl glycol | 2011 | |

Charge A in a properly equipped reaction vessel under a nitrogen blanket was heated to 80° C. and neopentyl glycol was added. The reaction mixture was heated to 200° C. and held thereat for about 8 hours until an acid value of about 10 was attained. The resultant composition was thinned to 90% solids with methy amyl ketone.

The resultant composition comprising a polyester polyol was further esterified to form yet another polyester polyol as follows:

| Ingredients | Parts by Weight (grams) |
|---|---|
| The above polyester polyol at 90% solids in methyl amyl ketone | 2587 413 |

| Ingredients | Parts by Weight (grams) |
|---|---|
| Adipic acid | |

The above polyester polyol and adipic acid were charged to a properly equipped reaction vessel and heated in a nitrogen atmosphere to react. Heating was continued to 200° C. and held thereat over a period of 5 hours with removal of the methyl amyl ketone solvent and subsequently water from the esterification until an acid value of about 10 was attained. The resultant product was thinned to about 90 percent solids with butyl acetate and analyzed as follows. Solids content measured at 110° C. for one hour was 83.0, viscosity was 24.3 stokes, acid value was 8.5 and hydroxyl value was 150.5.

An isocyanate prepolymer was prepared with the above polyester polyol; the resultant prepolymer was reacted with a hydroxyl-functional epoxy. The following were used in the preparation.

| Ingredients | Parts by Weight (grams) |
|---|---|
| The polyester polyol from above | 531.9 |
| Trimethylhexamethylene diisocyanate | 241.1 |
| Dibutyltin dilaurate | 0.08 |
| Butyl acetate | 26.8 |
| DENACOL 421[1] | 492.7 |
| Butyl acetate | 243.2 |

[1]Diglycerol polyglycidyl ether available from Nagase America Co.

To a properly equipped reaction vessel were charged the polyester polyol, the trimethylhexamethylene diisocyanate, the dibutyltin dilaurate and butyl acetate and heated to 60° C. to react in a nitrogen atmosphere. There resulted an exotherm with the reaction temperature rising to 101° C. The reaction mixture was cooled to 90° C. and held thereat for about 2 hours and 15 minutes until a constant isocyanate equivalent weight of 980 was attained.

To the resultant mixture comprising the isocyanate prepolymer, DENACOL 421 was added, heated to 90° C. and held thereat until all the isocyanate had reacted. Thereafter, butyl acetate was added to the reaction mixture to thin it to about 80 percent solids.

EXAMPLE 2

This example further illustrates the epoxy-functional polyurethanes of this invention and a method of preparing the same. The following were used in the preparation.

| Ingredients | Parts by Weight (grams) | |
|---|---|---|
| TERACOL 1000[1] | 2599.9 | Charge A |
| Isophorone diisocyanate | 1154.3 | |
| Dibutyltin dilaurate | 0.4 | |
| DENACOL 421 | 1648 | Charge B |
| Butyl acetate | 3585 | Charge C |

[1]A polyether polyol of molecular weight of about 1000, available from E. I. du Pont de Nemours and Co.

Charge A in a properly equipped reaction vessel was heated in a nitrogen atmosphere. The reaction mixture was held at 90° C. for about 4 hours until a constant isocyanate equivalent weight of about 937 was attained. Charges B and C were added to the reaction vessel. The resulting mixture was held at 90° C. until all the isocyanate had reacted. The reaction product was analyzed as follows. Solids content at 110° C. for one hour was 61.0, viscosity was 44.2 stokes, epoxy equivalent was 857.

EXAMPLE 3

A high solids coating composition comprising the epoxy-functional urethanes of this invention was prepared and used as follows:

| Ingredients | Parts by Weight (grams) | Resin Solids |
|---|---|---|
| Package A | | |
| Epoxy-functional urethane[1] | 19.9 | 12 |
| Epoxy-functional urethane[2] | 72 | 57.5 |
| RESIMINE[3] 717 | 23.8 | 20.0 |
| Oxyhexyl acetate | 45 | |
| Xylene | 22.5 | |
| Methyl amyl ketone | 22.4 | |
| Package B | | |
| TINUVIN 328[4] | 3.0 | 3.0 |
| TINUVIN 292[5] | 0.5 | 0.5 |
| Flow control agent[6] | 1.0 | 0.1 |
| Flow control agent[7] | 0.9 | 0.5 |
| Curing agent[8] | 35.4 | 24.8 |
| Curing agent[9] | 8.1 | 5.7 |
| ARMEEN DM 12D[10] | 2.0 | 2.0 |
| Oxyhexyl Acetate | 8.8 | |
| Xylene | 4.4 | |
| Metyl amyl ketone | 4.4 | |

[1]The epoxy-functional urethane was prepared in essentially the same manner as described in Example 2. It had an epoxy equivalent of 857, a solids content (at 110° C. for 1 hour) of 61.0 and viscosity of 44.2 stokes.
[2]The epoxy-functional urethane was prepared in essentially the same manner as described in Example 1. It had an epoxy equivalent of 479, a solids content (at 110° C. for 1 hour) of 79.9 and viscosity of 61.0 stokes.
[3]Aminoplast curing agent available from Monsanto Chemical Co.
[4]UV absorber available from Ciba Geigy.
[5]UV stabilizer available from Ciba Geigy.
[6]Silicone fluid available as DC 200 (at 10 centi stokes) from Dow Corning Corporation.
[7]Polybutyl acrylate flow control agent.
[8]Polyacid curing agent derived from reacting 1,6-hexanediol and methylhexahydrophthalic anhydride in a mole ratio of 1:2.
[9]Polyacid curing agent derived from reacting trimethylolpropane and methylhexahydrophthalic anhydride in a mole ratio of 1:3.
[10]Tertiary amine catalyst available from Armak Co.

Packages A and B were prepared separately by mixing the above ingredients in the order indicated above at low shear with good agitation. The two packages were combined in a ratio by weight of 3 to 1 of Package A to Package B. The final composition having a spray solids content of about 46 percent was spray applied to metallic and elastomeric substrates and cured by heating to 121° C. (250° F.) for about 30 minutes.

The coated substrate having a film thickness of 1.8 mils was evaluated for flexibility and hardness with the following results: The coated substrates exhibited Sward hardness of 40 and withstood a ½-inch mandrel test at room temperature without a substantial break. The coating also has a remarkable appearance. Distinctness of image (DOI) over metallic substrates was 100, and over elastomeric substrate was 95.

EXAMPLE 4

This example further illustrates the high solids coating composition and methods of preparing and using the same.

| Ingredients | Parts by Weight (grams) | Resin Solids |
|---|---|---|
| Package A | | |
| The epoxy-functional urethane described hereinabove | 87.8 | 70.3 |
| Oxyhexyl acetate | 26.9 | |
| Xylene | 13.4 | |

| Ingredients | Parts by Weight (grams) | Resin Solids |
|---|---|---|
| Methyl amyl ketone | 13.4 | |
| Package B | | |
| TINUVIN 328 | 3 | 3 |
| TINUVIN 292 | 0.5 | 0.5 |
| DC 200 | 1.0 | 0.1 |
| Flow control agent[2] | 0.9 | 0.5 |
| Curing agent[3] | 42.3 | 29.8 |
| ARMEEN DM 12D | 2.0 | 2.0 |
| Oxyhexyl Acetate | 10.5 | |
| Xylene | 5.3 | |
| Metyl amyl ketone | 5.2 | |

[1]The epoxy-functional urethane was essentially as described in Example 1. It had an epoxy equivalent weight of 556, solids content at 110° C. was 80.3 and viscosity was 180 stokes.
[2]Polybutyl acrylate.
[3]Polyacid curing agent derived from reactions 1,6-hexanediol and methylhexanydrophtalic anhydride in a mole ratio of 1:2.

The coating composition was formulated in essentially the same manner as described in Example 3. The resultant coating composition having a spray solids content of 50 percent was spray applied and evaluated for flexibility and hardness. The coated substrates exhibited Sward Hardness of 22 and withstood a ½-inch mandrel test at room temperature without a substantial break. Distinctness of image over metal was 90.

EXAMPLE 5

This example illustrates epoxy-functional polyurethane of this invention and a method of preparing the same.

| Ingredients | Parts by Weight (grams) | |
|---|---|---|
| T-1890L[1] | 733 | Charge A |
| DENACOL 421 | 1822 | |
| Butyl acetate | 364 | Charge B |

[1]isocyanurate derived from isophorone diisocyanate and commercially available from VEBA Company.

Charge B was added to Charge A and heated to 90° C. and held thereat until all the isocyanate had reacted.

The resultant mixture comprising an epoxy-functional urethane was analyzed with the following results: Solids at 110° C. was 79.6 percent, viscosity was 22.2 stokes, epoxy equivalent was 256.

EXAMPLE 6

A coating composition was prepared with the above epoxy-functional urethane and other ingredients listed hereinbelow:

| Ingredients | Parts by Weight (grams) | Resin Solids |
|---|---|---|
| TINUVIN 328 | 3.0 | 3.0 |
| TINUVIN 292 | 0.5 | 0.5 |
| DC 200 | 1.0 | 0.1 |
| Flow control agent[1] | 0.9 | 0.5 |
| Solvent Blend[2] | 50.2 | |
| Epoxy-functional polyurethane of Example 5 | 68.6 | 54.9 |
| Curing agent[3] | 54.2 | 36.3 |
| Curing agent[4] | 12.5 | 8.8 |
| ARMEEN DM 12D | 2.0 | 2.0 |

[1]The flow control agent was polybutyl acrylate.
[2]Comprising oxyhexyl acetate, xylene and methyl amyl ketone.
[3]Polyacid curing agent derived from 1,6-hexanediol and methylhexanydrophtalic anhydride in a mole ratio of 1:2.
[4]Polyacid curing agent available from reacting trimethylolpropane and methylhexahydrophthalic anhydride in a mole ratio of 1:3.

The coating composition was prepared by blending the above thoroughly and the resultant coating composition at as 55 percent resin solids was spray applied to metallic and elastomeric substrates, cured, and evaluated in essentially the same manner as described in Example 3.

The coated and cured substrates were found to have excellent appearance; distinctness of image over metallic substrates of 100, and distinctness of image over elastomeric substrates of 70; excellent room temperature flexibility, good flexibility at 20° F.; Sward hardness of 16, excellent solvent resistance; and good impact resistance.

What is claimed is:

1. A low molecular weight epoxy-functional polyurethane which is prepared by reacting:
   (a) an isocyanate with
   (b) a hydroxy-functional polyepoxide having more than 2 epoxy groups per molecule.

2. A low molecular weight epoxy-functional polyurethane of claim 1, wherein the isocyanate equivalent weight is about 87 to 2000.

3. An epoxy-functional polyurethane of claim 1, wherein the isocyanate is a simple polyisocyanate, a biuret, an isocyanurate, isocyanate prepolymer or a mixture thereof.

4. An epoxy-functional polyurethane of claim 1, wherein the hydroxy-functional polyepoxide has an epoxy equivalent weight of about 50 to 1000.

5. An epoxy-functional polyurethane of claim 1, wherein the hydroxy-functional polyepoxide has a hydroxy equivalent weight of about 100 to 2000.

6. An epoxy-functional polyurethane of claim 1, wherein the hydroxy-functional polyepoxide is a hydroxy-functional polyglycidyl either.

7. A high solids theremosetting coating composition comprising:
   (a) the epoxy-functional polyurethane of claim 1, and
   (b) a curing agent which is selected from the group consisting of polyacids, anhydride, polyamine and a mixture thereof.

8. A high solids theremosetting coating composition of claim 7, wherein the polyacid is (a) derived from reacting 1,6-hexandiol and methlhexahydrophthalic anhydride in a mole ration of 1:2 or the polyacid is (b) derived from reacting trimethylolpropane or polycaprolactone triol or mixture thereof with methylhexahydropthalic anhydride in a mole ratio of about 1:3, or (c) a mixture of (a) and (b).

9. A high solids theremosetting coating composition as recited in claim 7 which further comprises an aminoplast or an isocyanate, a blocked isocyanate or alkoxysilane as a curing agent.

10. A high solids theremosetting coating composition of claim 7, having a sprayability of 40 to 65 percent or higher.

* * * * *